United States Patent [19] [11] 3,883,660
Shen et al. [45] May 13, 1975

[54] TREATMENT OF PAIN, FEVER OR INFLAMMATION WITH 5-FLUORO-2-METHYL-1-CP-METHYLSULFINYL-BENZYLIDENE)-3-INDENYLACETALDEHYDE

[75] Inventors: Tsung-Ying Shen, Westfield; Howard Jones, Holmdel, both of N.J.

[73] Assignee: Merck & Co., Inc., Rahway, N.J.

[22] Filed: Sept. 7, 1972

[21] Appl. No.: 287,130

Related U.S. Application Data

[63] Continuation-in-part of Ser. No. 248,291, April 27, 1972, abandoned.

[52] U.S. Cl. .............................................. 424/303
[51] Int. Cl............................................ A61k 27/00
[58] Field of Search ..................................... 424/303

[56] References Cited
UNITED STATES PATENTS

| | | | |
|---|---|---|---|
| 3,654,349 | 4/1972 | Shen et al. | 424/304 |
| 3,720,774 | 3/1973 | Peister et al. | 424/303 |
| 3,725,548 | 4/1973 | Shen et al. | 424/303 |
| 3,732,292 | 5/1973 | Hinkley et al. | 260/515 A |

*Primary Examiner*—Stanley J. Friedman
*Attorney, Agent, or Firm*—Mario A. Monaco; Harry E. Westlake, Jr.

[57] ABSTRACT

New substituted indenyl acetaldehydes, having anti-inflammatory, anti-pyretic and analgesic activity. Also included herein are methods of preparing said indenyl acetaldehydes, pharmaceutical compositions having said indenyl acetaldehydes as an active ingredient and methods of treating inflammation by administering these particular compositions to patients.

2 Claims, No Drawings

THE TREATMENT OF PAIN, FEVER OR INFLAMMATION WITH 5-FLUORO-2-METHYL-1-CP-METHYLSULFINYL-BENZYLIDENE)-3-INDENYLACETALDEHYDE

RELATED APPLICATIONS

This application is a continuation-in-part of Application Ser. No. 248,291 filed Apr. 27, 1972 now abandoned.

SUMMARY OF THE INVENTION

Generally, this invention relates to new substituted indenyl acetaldehydes and processes for producing the same. This invention also relates to pharmaceutical compositions containing said indenyl acetaldehydes as an active ingredient and to methods of treating pain, fever or inflammation by administering these particular compounds to patients.

DESCRIPTION AND PREFERRED EMBODIMENTS

This invention relates to new substituted indenyl acetaldehydes and processes for producing the same. More specifically, this invention relates to compounds having the following general formula:

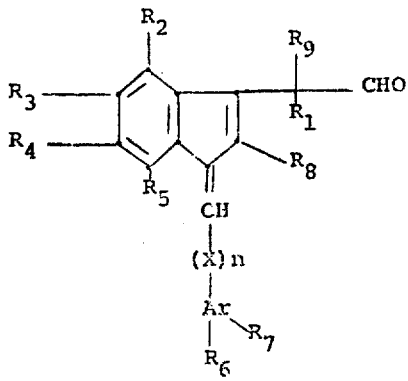

wherein:
$R_1$ and $R_9$ each may be loweralkenyl, loweralkylthio, arylthio, amino, loweralkylamino, N-heteroaryl, alkenyloxy, alkoxycarbonyl, hydrogen, loweralkyl, haloloweralkyl, halo, acylamino, aralkoxycarbonyl, dialkylamino, hydroxy, loweralkoxy, alkynyloxy, aralkoxy, carboxy and together can be alkenyl or carbonyl.

$R_2$, $R_3$, $R_4$, $R_5$, $R_6$ and $R_7$ each may be hydrogen, alkyl, acyloxy, aryloxy, alkoxy, nitro, amino, acylamino, alkylamino, dialkylamino, alkenyl, alkynyl, alkenyloxy, dialkylaminoalkyl, sulfamyl, alkylthio, alkylsulfinyl, alkylsulfonyl, hydroxy, hydroxyalkyl, acyl, halo, cyano, carboxyl, carboalkoxy, carbamido, haloalkyl, cycloalkyl, cycloalkloxy or aroyl.

$R_8$ may be hydrogen, alkyl, haloalkyl, alkenyl, alkynyl or trihalomethyl;

X may be alkylene, alkenylene, alkynylene, O, S, sulfinyl, sulfonyl or NR where R can be hydrogen or alkyl;

Ar is aryl or heteroaryl; and $n$ is 0 or 1 with the exception that when $n$ is 0, $R_1$, $R_2$, $R_4$, $R_5$ and $R_9$ are hydrogen, $R_6$ and $R_7$ is methylsulfinyl and the other hydrogen, Ar is phenyl and $R_8$ is methyl, $R_3$ is other than fluoro.

The compound which is excluded from the general formula above is disclosed in Greek Pat. No. 41,736 issued Jan. 11, 1971 and corresponds to U.S. Application Ser. No. 33,890 filed May 5, 1970, still pending. The compound is described as an intermediate for preparing indenyl acetic acids. We have found that this compound, however, has pharmaceutical properties as the compounds themselves claimed herein and are administered in the same manner and dosage as described hereinbelow for the compounds of this invention. This discovery makes up another part of our invention.

The aryl or heteroaryl substituent in the 1-position of the indene nucleus may include an aryl ring system such as benzene, naphthalene or biphenyl or a heteroaryl ring system such as pyrrole, furan, thiophene, pyridine, imidazole, pyrazine, thiazole, etc., and may be substituted with any of the aformentioned $R_6$ and $R_7$ substituents.

In the most preferred compounds of this invention $R_1$ and $R_9$ each may be hydrogen or loweralkyl, $R_2$, $R_3$, $R_4$ and $R_5$ each may be hydrogen, halogen, loweralkoxy, loweralkyl, nitro, amino or substituted amino such as dialkylamino, alkylamino, etc., $R_6$ is alkylsulfinyl, $R_7$ is hydrogen, $R_8$ is loweralkyl, X is alkylene or alkenylene, $n$ is 0 or 1 and Ar is phenyl. In these preferred groups the hydro carbon chains are those which contain at most 5 carbon atoms. However, the substituents on the indenyl acetaldehyde nucleus are not limited to the preferred class of substituents and includes all those set forth in Formula I, as well as those which are therapeutically equivalent to those which are specifically enumerated.

Representative compounds of this invention are as follows:

5-Hydroxy-2-methyl-1-(p-methylsulfinylbenzylidene)-indenyl-3-acetaldehyde;

5-Methoxy-2-methyl-1-(p-methylsulfinylbenzylidene)-indenyl-3-acetaldehyde;

α-[5-Fluoro-2-methyl-1-(p-methylsulfinylbenzylidene)-3-indene]propionaldehyde;

5,6-Difluoro-2-methyl-1-(p-methylsulfinylbenzylidene)-indenyl-3-acetaldehyde;

5-Chloro-2-methyl-1-(p-methylsulfinylbenzylidene)-indenyl-3-acetaldehyde;

5-Trifluoromethyl-2-methyl-1-(p-methylsulfinylbenzylidene)-indenyl-3-fluoroacetaldehyde;

2,5-Dimethyl-1-(p-methylsulfinylbenzylidene)-indenyl-3-acetaldehyde;

5,7-Difluoro-2-methyl-1-(p-methylsulfinylbenzylidene)-indenyl-3-acetaldehyde;

α-[5,7-Difluoro-2-methyl-1-(p-methylsulfinylbenzylidene)-3-indene]propionaldehyde;

5-Dimethylamino-6-fluoro-2-methyl-1(3'-fluoro-4'-methylsulfinylbenzylidene)-indenyl-3-acetaldehyde;

5-Methoxy-6-fluoro-2-methyl-1-(p-fluorobenzylidene)-indenyl-3-acetaldehyde;

α-[5-Methoxy-6-fluoro-2-methyl-1-(p-methylthiobenzylidene)-3-indene]propionaldehyde;

1-Cinnamylidenyl-5-fluoro-2-methyl-indenyl-3-acetaldehyde;

5-Fluoro-2-methyl-1-(p-methylsulfinylcinnamylidene)-indenyl-3-acetaldehyde;

5-Methoxy-2-methyl-1-(p-chlorobenzylidene)-indenyl-3-acetaldehyde; and

5-Fluoro-2-methyl-1-(p-methylsulfonylbenzylidene)-indenyl-3-acetaldehyde.

This invention also relates to a method of treating, pain, fever or inflammation in patients using a compound of Formula I, particularly the preferred compounds and especially 5-fluoro-2-methyl-1-(p-methylsulfinylbenzylidene)-indenyl-3-acetaldehyde as the active constituent.

The compounds of the instant invention can be used to treat inflammation by reducing inflammation and relieving pain in such diseases as rheumatoid arthritis, osteoarthritis, gout, infectious arthritis and rheumatic fever. The compounds of Formula I also have anti-pyretic and analgesic activity and would be administered and used in the same manner and in the same dosage ranges as if they were being used to treat inflammation as discussed further on.

The treatment of inflammation in accordance with the method of the present invention is accomplished by topically, orally, rectally or parenterally administering to patients a composition of a compound of Formula I, particularly the especially preferred compounds in a non-toxic pharmaceutically acceptable carrier.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, cab-o-sil, and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup, an aqueous solution or a liquid suspension. Suppositories may be prepared in a conventional manner by mixing the compounds of this invention with a suitable non-irritating excipient which is solid at room temperature, but liquid at the rectal temperature. Such materials are cocoa butter and polyethylene glycol. Gels and lotions for topical application may be prepared in conventional manners.

The active compounds of Formula I and of the compositions of this invention are administered in an amount sufficient to treat inflammation, that is to reduce inflammation. Advantageously, the compositions will contain the active ingredient, namely, the compounds of Formula I in an amount of from about 0.1 mg. to 50 mg. per kg. body weight per day (5 mg. to 3.5 g. per patient per day), preferably from about 1 mg. to 15 mg./kg. body weight per day (50 mg. to 1 g. per patient per day).

The method of treatment of this invention comprises administering to a patient (animal or human), a compound of Formula I, particularly an especially preferred compound admixed with a non-toxic pharmaceutical carrier such as exemplified above. The compounds of Formula I and particularly the especially preferred compounds will be administered in an amount of from 0.1 mg. to 50 mg./kg. body weight per day, preferably from about 1 mg. to about 15 mg. per kilogram body weight per day. The most rapid and effective anti-inflammatory effect is obtained from oral administration of a daily dosage of from about 1 to 15 mg./kg./day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of excretion, drug combination, reaction sensitivities and severity of the particular disease.

In the preparation of the compounds of this invention the starting material is a 1-unsubstituted indenyl-3-acetic acid. This compound is esterified and reduced to form the corresponding alcohol. The desired 1-substituent is inserted and the alcohol is oxidized to the corresponding aldehyde.

EXAMPLE 1

5-Fluoro-2-methyl-1-(p-chlorobenzylidene)-indenyl-3-acetaldehyde

A. Methyl 5-fluoro-2-methylindenyl-3-acetate

5-Fluoro-2-methylindenyl-3-acetic acid (10.0 g.) is refluxed with stirring in methanol (100 ml.) containing concentrated sulfuric acid (2 ml.) for 1 hour. The solution is evaporated to near dryness at 10°C. and extracted into ether-water (10:1, 200 ml.), separated and washed with saturated sodium bicarbonate solution (2 × 50 ml.) then water again (50 ml.). The ether layer is dried (MgSO$_4$), filtered and evaporated to give the solid ester m.p. 53.5–54.5.

Using the same reaction conditions and techniques, the following indenyl esters are prepared in accordance with the procedure of Example 1A:

| STARTING MATERIAL | PRODUCT |
|---|---|
| 5-methoxy-2-methylindenyl-3-acetic acid | methyl 5-methoxy-2-methylindenyl-3-acetate |
| 5-chloro-2-methylindenyl-3-acetic acid | methyl 5-chloro-2-methylindenyl-3-acetate |
| 5,6-difluoro-2-methylindenyl-3-acetic acid | methyl 5,6-difluoro-2-methylindenyl-3-acetate |
| 5-fluoro-6-methoxy-2-methylindenyl-3-acetic acid | methyl 5-fluoro-6-methoxy-2-methylindenyl-3-acetate |
| 5-cyano-2-ethylindenyl-3-acetic acid | methyl 5-cyano-2-ethylindenyl-3-acetate |
| 5-allyloxylindenyl-3-acetic acid | methyl 5-allyloxyindenyl-3-acetate |
| 5-amino-2-vinylindenyl-3-acetic acid | methyl 5-amino-2-vinylindenyl-3-acetate |
| 5-dimethylamino-2-methylindenyl-3-acetic acid | methyl 5-dimethylamino-2-methylindenyl-3-acetate |
| 5-hydroxy-2-methylindenyl-3-acetic acid | methyl 5-hydroxy-2-methylindenyl-3-acetate |
| 6-cyclopropyl-2-methylindenyl-3-acetic acid | methyl 6-cyclopropyl-2-methylindenyl-3-acetate |
| 5-sulfamyl-2-methylindenyl-3-acetic acid | methyl 5-sulfamyl-2-methylindenyl-3-acetate |
| α-(5-fluoro-2-methylindenyl)-3-propionic acid | methyl α-(5-fluoro-2-methylindenyl)-3-propionate |

B. 5-Fluoro-2-methyl-idenyl-3β-ethanol

The ester in ether (75 ml.) is added with stirring over one-half hour to a suspension of lithium aluminum hydroxide (1.0 g.) in ether (50 ml.). The mixture is then refluxed for 3 hours, cooled in ice bath, methanol (50 ml.) added slowly followed by water (50 ml.). Anhydrous magnesium sulfate is added and the mixture stirred, filtered and redried with magnesium sulfate. The ether solution is evaporated to give an oil which was chromatographed on silica-gel (200 g. Baker 60–200 mesh). Benzene elutes the desired alcohol m.p. 64°–66°.

Using the same reaction conditions and techniques, the following indenyl alcohols are prepared in accordance with the procedure of Example 1B.

| STARTING MATERIAL | PRODUCT |
| --- | --- |
| methyl 5-methoxy-2-methylindenyl-3-acetate | 5-methoxy-2-methylindenyl-3-β-ethanol |
| methyl 5-chloro-2-methylindenyl-3-acetate | 5-chloro-2-methylindenyl-3-β-ethanol |
| methyl 5,6-difluoro-2-methylindenyl-3-acetate | 5,6-difluoro-2-methylindenyl-3-β-ethanol |
| methyl 5-fluoro-6-methyoxy-2-methylindenyl-3-acetate | 5-fluoro-6-methoxy-2-methylindenyl-3-β-ethanol |
| methyl 5-cyano-2-ethylindenyl-3-acetate | 5-cyano-2-ethylindenyl-3-β-ethanol |
| methyl 5-allyloxylindenyl-3-acetate | 5-allyloxylindenyl-3-β-ethanol |
| methyl 5-amino-2-vinylindenyl-3-acetate | 5-amino-2-vinylindenyl-3-β-ethanol |
| methyl 5-dimethylamino-2-methylindenyl-3-acetate | 5-dimethylamino-2-methylindenyl-3-β-ethanol |
| methyl 5-hydroxy-2-methylindenyl-3-acetate | 5-hydroxy-2-methylindenyl-3-β-ethanol |
| methyl 6-cyclopropyl-2-methylindenyl-3-acetate | 6-cyclopropyl-2-methylindenyl-3-β-ethanol |
| methyl 5-sulfamyl-2-methylindenyl-3-acetate | 5-sulfamyl-2-methylindenyl-3-β-ethanol |
| methyl α-(5-fluoro-2-methylindenyl)-3-propionate | α-(5-fluoro-2-methylindenyl-3-propanol |

C. 5-Fluoro-2-methyl-1-(p-chlorobenzylidene)-indenyl-3-β-ethanol

To a solution of 5-fluoro-2-methylindenyl-3β-ethanol (1.92 g. 0.01 mole) in methanol (30 ml.) is added sodium methoxide (1.08 g. 0.02 mole), and then p-chlorobenzaldehyde (0.01 mole). This solution is refluxed overnight, poured into ether water (10:1 300 ml.), the ether back washed with water, dried (MgSO₄) and concentrated to a yellow oil (3.4 g.) (3). This oil is chromatographed on silica-gel (100 g. Baker 60–200 mesh) and ethyl acetate elutes the desired alcohol m.p. 150°–151.5°.

Using the same reaction conditions and techniques, the following 1-substituted alcohols are prepared in accordance with the procedure of Example 1C.

| STARTING MATERIAL | REACTANT | PRODUCT |
| --- | --- | --- |
| 5-methyoxy-2-methylindenyl-3-β-ethanol | p-methylsulfinyl-benzaldehyde | 5-methoxy-2-methyl-1-(p-methylsulfinylbenzylidene)-indenyl-3-β-ethanol |
| 5-chloro-2-methylindenyl-3-β-ethanol | p-methylsulfinyl-benzaldehyde | 5-chloro-2-methyl-1-(p-methylsulfinylbenzylidene)-indenyl-3-β-ethanol |
| 5,6-difluoro-2-methylindenyl-3-β-ethanol | p-methylsulfinyl-benzaldehyde | 5,6-difluoro-2-methyl-1-(p-methylsulfinylbenzylidene)-indenyl-3-β-ethanol |
| 5-fluoro-6-methoxy-2-methylindenyl-3-β-ethanol | p-methylsulfinyl-benzaldehyde | 5-fluoro-6-methoxy-2-methyl-1-(p-methylsulfinylbenzylidene)-indenyl-3-β-ethanol |
| 5-cyano-2-ethylindenyl-3-β-ethanol | p-methylsulfinyl-benzaldehyde | 5-cyano-2-ethyl-1-(p-methylsulfinylbenzylidene)-indenyl-3-β-ethanol |
| 5-allyloxylindenyl-3-β-ethanol | p-methylsulfinyl-benzaldehyde | 5-allyloxy-1-(p-methylsulfinylbenzylidene)-indenyl-3-β-ethanol |
| 5-amino-2-vinylindenyl-3-β-ethanol | p-methylsulfinyl-benzaldehyde | 5-amino-2-vinyl-1-(p-methylsulfinylbenzylidene)-indenyl-3-β-ethanol |
| 5-dimethylamino-2-methylindenyl-3-β-ethanol | p-methylsulfinyl-benzaldehyde | 5-dimethylamino-2-methyl-1-(p-methylsulfinylbenzylidene)-indenyl-3-β-ethanol |
| 5-fluoro-2-methylindenyl-3-β-ethanol | p-methylsulfinyl-benzaldehyde | 5-fluoro-2-methyl-1-(p-methylsulfinylbenzylidene)-indenyl-3-β-ethanol |
| 5-hydroxy-2-methylindenyl-3-β-ethanol | p-methylsulfinyl-benzaldehyde | 5-hydroxy-2-methyl-1-(p-methylsulfinylbenzylidene)-indenyl-3-β-ethanol |
| 6-cyclopropyl-2-methylindenyl-3-ethanol | p-methylsulfinyl-benzaldehyde | 6-cyclopropyl-2-methyl-1-(p-methylsulfinylbenzylidene)-indenyl-3-β-ethanol |
| 5-sulfamyl-2-methylindenyl-3-β-ethanol | p-methylsulfinyl-benzaldehyde | 5-sulfamyl-2-methyl-1-(p-methylsulfinylbenzylidene)-indenyl-3-β-ethanol |
| α-(5-fluoro-2-methylindenyl-3-propanol | p-methylsulfinyl-benzaldehyde | α-[5-fluoro-2-methyl-1-(p-methylsulfinylbenzylidene)]-3-propanol |
| 5-fluoro-2-methylindenyl-3-β-ethanol | p-methylbenzaldehyde | 5-fluoro-2-methyl-1-(p-methylbenzylidene)-indenyl-3-β-ethanol |
| 5-methoxy-2-methylindenyl-3-β-ethanol | p-chlorobenzaldehyde | 5-methoxy-2-methyl-1-(p-chlorobenzylidene)-indenyl-3-β-ethanol |
| 5-chloro-2-methylindenyl-3-β-ethanol | p-cyclopropyl-benzaldehyde | 5-chloro-2-methyl-1-(p-cyclopropylbenzylidene)-indenyl-3-β-ethanol |
| 5-fluoro-2-methylindenyl-3-β-ethanol | cinnamaldehyde | 1-cinnamylidene-5-fluoro-2-methylindenyl-3-β-ethanol |
| 5-fluoro-2-methyl | 4-methylsulfinyl-cinnamaldehyde | 5-fluoro-2-methyl-1-(p-methylsulfinylcinnamylidene)indenyl-3-β-ethanol |

D. 5-Fluoro-2-methyl-1-(p-chlorobenzylidene)-indenyl-3-acetaldehyde

The indenyl alcohol (0.004 moles) is added to a solvent mixture of dimethylsulfoxide-benzene (1:1 20 ml.) containing dicyclohexyldiimide (4.95 g., 0.024 moles), trifluoroacetic acid (0.32 ml.) and pyridine (0.64 ml.). The mixture is stirred at room temperature overnight and then oxalic acid (2.16 g.) in methanol (20 ml.) is added followed by ether (100 ml.) and water (100 ml.). The solution is filtered and the residual solution chromtographed as in on silica-gel (100 g. Baker analyzed 60–200 mesh) eluting the desired material with ethyl acetate (0.85 gm.).

Using the same reaction conditions and techniques, the following indenyl acetaldehydes are prepared in accordance with the procedure of Example 1D.

| STARTING MATERIAL | PRODUCT |
| --- | --- |
| 5-methoxy-2-methyl-1-(p-methylsulfinylbenzylidene)-indenyl-3-β-ethanol | 5-methoxy-2-methyl-1-(p-methylsulfinylbenzylidene)-indenyl-3-acetaldehyde |
| 5-chloro-2-methyl-1-(p-methylsulfinylbenzylidene)-indenyl-3-β-ethanol | 5-chloro-2-methyl-1-(p-methylsulfinylbenzylidene)-indenyl-3-acetaldehyde |
| 5,6-difluoro-2-methyl-1-(p-methylsulfinylbenzylidene)-indenyl-3-β-ethanol | 5,6-difluoro-2-methyl-1-(p-methylsulfinylbenzylidene-indenyl-3-acetaldehyde |
| 5-fluoro-6-methoxy-2-methyl-1-(p-methylsulfinylbenzylidene)-indenyl-3-β-ethanol | 5-fluoro-6-methoxy-2-methyl-1-(p-methylsulfinylbenzylidene)-indenyl-3-acetaldehyde |
| 5-cyano-2-ethyl-1-(p-methylsulfinylbenzylidene)-indenyl-3-β-ethanol | 5-cyano-2-ethyl-1-(p-methylsulfinylbenzylidene)-indenyl-3-acetaldehyde |
| 5-allyloxy-1-(p-methylsulfinylbenzylidene)-indenyl-3-β-ethanol | 5-allyloxyl-1-(p-methylsulfinylbenzylidene)-indenyl-3-acetaldehyde |
| 5-amino-2-vinyl-1-(p-methylsulfinylbenzylidene)-indenyl-3-β-ethanol | 5-amino-2-vinyl-1-(p-methylsulfinylbenzylidene)-indenyl-3-acetaldehyde |
| 5-dimethylamino-2-methyl-1-(p-methylsulfinylbenzylidene)-indenyl-3-β-ethanol | 5-dimethylamino-2-methyl-1-(p-methylsulfinylbenzylidene)-indenyl-3-acetaldehyde |
| 5-fluoro-2-methyl-1-(p-methylsulfinylbenzylidene)-indenyl-3-β-ethanol | 5-fluoro-2-methyl-1-(p-methylsulfinylbenzylidene)-indenyl-3-acetaldehyde |
| 5-hydroxy-2-methyl-1-(p-methylsulfinylbenzylidene)-indenyl-3-β-ethanol | 5-hydroxy-2-methyl-1-(p-methylsulfinylbenzylidene)-indenyl-3-acetaldehyde |
| 6-cyclopropyl-2-methyl-1-(p-methylsulfinylbenzylidene)-indenyl-3-β-ethanol | 6-cyclopropyl-2-methyl-1-(p-methylsulfinylbenzylidene)-indenyl-3-acetaldehyde |
| 5-sulfamyl-2-methyl-1-(p-methylsulfinylbenzylidene)-indenyl-3-β-ethanol | 5-sulfamyl-2-methyl-1-(p-methylsulfinylbenzylidene)-indenyl-3-acetaldehyde |
| α-(5-fluoro-2-methyl-1-(p-methylsulfinylbenzylidene)-indenyl-3-propanol | α-(5-fluoro-2-methyl-1-(p-methylsulfinylbenzylidene)-indenyl-3-acetaldehyde |
| 5-fluoro-2-methyl-1-(p-methylsulfinylbenzylidene)-indenyl-3-β-ethanol | 5-fluoro-2-methyl-1-(p-methylsulfinylbenzylidene)-indenyl-3-acetaldehyde |
| 5-methoxy-2-methyl-1-(p-chlorobenzylidene)-indenyl-3-β-ethanol | 5-methoxy-2-methyl-1-(p-chlorobenzylidene)-indenyl-3-acetaldehyde |
| 5-chloro-2-methyl-1-(p-cyclopropylbenzylidene-indenyl-3-β-ethanol | 5-chloro-2-methyl-1-(p-cyclopropylbenzylidene)-indenyl-3-acetaldehyde |
| 1-cinnamylidene-5-fluoro-2-methylidenyl-3-β-ethanol | 1-cinnamylidene-5-fluoro-2-methylidenyl-3-acetaldehyde |
| 5-fluoro-2-methyl-1-(p-methylsulfinylcinnamylidene)-indenyl-3-β-ethanol | 5-fluoro-2-methyl-1-(p-methylsulfinylcinnamylidene)-indenyl-3-β-ethanol |

EXAMPLE 2

A. Ethyl 5-nitro-2-methylindenyl-3-α-fluoroacetate

6-Nitro-2-methylindanone (26.3 g.) and ethyl bromofluoracetate (30.2 g.) in benzene (500 ml.) are added slowly to zinc-amalgam (48.3 g.) and a crystal of iodine under benzene (20 ml.) to promote self-sustaining gentle reflux. When all has been added, the mixture is refluxed for 2 hours, cooled to 5°C. and acidified with 10 percent sulfuric acid.

The benzene layer is dried (MgSO₄) and evaporated to give an oil which is distilled at 100°–170° and 0.25 mm. of pressure. The main faction b.p. 142°–144°/0.25 mm. is ethyl 2-fluoro-1-hydroxy-2-methyl-6-nitroindanyl-3-acetate.

This oil (1.0 g.) in benzene (50 ml.) is stirred with phosphourous pentoxide (3.0 g.) at reflux for 15 min., cooled and filtered. The benzene filtrate is washed with water (10 ml.), separated and dried (MgSO₄). Evaporation of the benzene gives the title compound.

Using the same reaction conditions and techniques, the following indenyl esters are prepared in accordance with the procedure of Example 2A.

| STARTING MATERIAL | PRODUCT |
| --- | --- |
| 6-nitro-2-fluoromethylindanone | ethyl 5-nitro-2-fluoromethylindenyl-3-α-fluoroacetate |
| 6-nitro-2-trifluoromethylindanone | ethyl 5-nitro-2-trifluoromethylindenyl-3-α-fluoroacetate |
| 6-fluoromethyl-2-methylindanone | ethyl 5-fluoromethyl-2-methylindenyl-3-α-fluoroacetate |
| 5-benzoyl-2-methylindanone | ethyl 5-benzoyl-2-methylindenyl-3-α-fluoroacetate |
| 5-acetyl-2-fluoromethylindanone | ethyl 6-acetyl-2-methylindenyl-3-α-fluoroacetate |
| 6-carboethoxy-2-methylindanone | ethyl 5-carboethoxy-2-methylindenyl-3-α-fluoroacetate |
| 6-carbamido-2-trifluoromethylindanone | ethyl 5-carbamido-2-trifluoromethylindenyl-3-α-fluoroacetate |
| 5-carboxyl-2-fluoromethylindanone | ethyl 6-carboxyl-2-fluoromethylindenyl-3-α-fluoroacetate |

B. 5-Nitro-2-methylindenyl-3-α-fluoroacetic acid

Ethyl 5-nitro-2-methylindenyl-3-α-fluoroacetate (2.0 g.) is dissolved in methanol (10 ml.) and sodium methoxide (0.5 g.) added with stirring. Water (1 ml.) is then added and after 15 min. the mixture is acidified with 2.5 N. hydrochloric acid at ice-bath temperatures, and filtered to yield the acid.

Using the same reaction conditions and techniques, the following indenyl 3-α-fluoroacetic acids are prepared in accordance with the procedure of Example 2B.

| STARTING MATERIAL | PRODUCT |
| --- | --- |
| ethyl 5-nitro-2-fluoromethylindenyl-3-α-fluoroacetate | 5-nitro-2-fluoromethylindenyl-3-α-fluoroacetic acid |
| ethyl 5-nitro-2-trifluoromethylindenyl-3-α-fluoroacetate | 5-nitro-2-trifluoromethylindenyl-3-α-fluoroacetic acid |
| ethyl 5-fluoromethyl-2-methylindenyl-3-α-fluoroacetate | 5-fluoromethyl-2-methylindenyl-3-α-fluoroacetic acid |
| ethyl 5-benzoyl-2-methylindenyl-3-α-fluoroacetate | 5-benzoyl-2-methylindenyl-3-α-fluoroacetic acid |
| ethyl 6-acetyl-2-methylindenyl-3-α fluoroacetate | 6-acetyl-2-methylindenyl-3-α-fluoroacetic acid |
| ethyl 5-carboethoxy-2-methylindenyl-3-α-fluoroacetate | 5-carboethoxy-2-methylindenyl-3-α-fluoroacetic acid |
| ethyl 5-carbamido-2-trifluoromethylindenyl-3-α-fluoroacetate | 5-carbamido-2-trifluoromethylindenyl-3-α-fluoroacetic acid |
| ethyl 6-carboxyl-2-fluoromethylindenyl-3-αfluoroacetate | 6-carboxyl-2-fluoromethylindenyl-3-α-fluoroacetic acid |

C. 5-Nitro-2-methylindenyl-3-fluoroacetaldehyde

5-Nitro-2-methylindenyl-3-α-fluoroacetic acid (25 g.) is stirred in tetrahydrofuran (400 ml.) at room temperature while thionyl chloride (12 g.) is added in benzene (10 ml.).

The solution is evaporated to dryness and the product reacted with diethylamine solution as described in Truitt et al. J. Amer. Chem. Soc. 71 3480 (1949) to give N,N'-diethyl 5-nitro-2-methyl-3-β-fluoroacetamide.

N,N'-diethyl 5-nitro-2-methyl-3-β-fluoroacetamide (15 g.) is added in dry tetrohydrofuran (100 ml.) to a stirred suspension of lithium tri-t-butoxyaluminum hydride (3.3 g.) in tetrahydrofuran (10 ml.) over 1 hour. The reaction mixture is then refluxed for 1 hour, cooled, poured into ice water and the furan layer separated. The organic solution is dried (MgSO$_4$) and evaporated to dryness. Chromatography on silica-gel (Baker 60–200 mesh) gives the desired aldehyde.

Using the same reaction conditions and techniques, the following aldehydes are prepared in accordance with the procedure of Example 2C.

| STARTING MATERIAL | PRODUCT |
| --- | --- |
| 5-nitro-2-fluoromethylindenyl-3-α-fluoroacetic acid | 5-nitro-2-fluoromethylindenyl-3-α-fluoroacetaldehyde |
| 5-nitro-2-trifluoromethylindenyl-3-α-fluoroacetic acid | 5-nitro-2-trifluoromethylindenyl-3-α-fluoroacetaldehyde |
| 5-fluoromethyl-2-methylindenyl-3-α-fluoroacetic acid | 5-fluoromethyl-2-methylindenyl-3-α-fluoroacetaldehyde |
| 5-benzoyl-2-methylindenyl-3-α-fluoroacetic acid | 5-benzoyl-2-methylindenyl-3-α-fluoroacetaldehyde |
| 6-acetyl-2-methylindenyl-3-α-fluoroacetic acid | 6-acetyl-2-methylindenyl-3-α-fluoroacetaldehyde |
| 5-carboethoxy-2-methylindenyl-3-α-fluoroacetic acid | 5-carboethoxy-2-methylindenyl-3-α-fluoroacetaldehyde |
| 5-carbamido-2-trifluoromethylindenyl-3-α-fluoroacetic acid | 5-carbamido-2-trifluoromethylindenyl-3-α-fluoroacetaldehyde |
| 6-carboxyl-2-fluoromethylindenyl-3-αfluoroacetic acid | 6-carboxyl-2-fluoromethylindenyl-3-α-fluoroacetaldehyde |

D. The ethylene acetal protected aldehyde

5-Nitro-2-methylindenyl-3-fluoroacetaldehyde (23.4 g.), ethyleneglycol (6.5 g.) and p-toluene sulfonic acid (0.1 g.) in benzene (200 ml.) are refluxed for 18 hours under a Dean-Stark water trap. The benzene solution is washed twice with water (50 ml.), dried and evaporated to dryness. The product is an oil.

E. 5-Nitro-2-methyl-1-(p-methylsulfinylbenzylidene)-indenyl-3-fluoroacetaldehyde-ethylene ketal The protected aldehyde (27.8 g.) is reacted as described in Example 1 part C to give the title compound.

Using the same reaction conditions and techniques, the following 1-substituted indenylacetaldehydes are prepared in accordance with the procedures of Examples 2D and 2E.

| STARTING MATERIAL | REACTANT | PRODUCT |
| --- | --- | --- |
| 5-nitro-2-fluoromethylindenyl-3-α-fluoroacetaldehyde | p-methylsulfinylbenzaldehyde | 5-nitro-2-fluoromethyl-1-(p-methylsulfinylbenzylidene)-indenyl-3-fluoroacetaldehyde-ethylene ketal |
| 5-fluoromethyl-2-methylindenyl-3-α-fluoroacetaldehyde | p-methylsulfinylbenzaldehyde | 5-fluoromethyl-2-methyl-1-(p-methylsulfinylbenzylidene)-indenyl-3-fluoroacetaldehyde-ethylene ketal |
| 5-benzoyl-2-methylindenyl-3-α-fluoroacetaldehyde | p-methylsulfinylbenzaldehyde | 5-benzoyl-2-methyl-1-(p-methylsulfinylbenzylidene)-indenyl-3-fluoroacetaldehyde-ethylene ketal |
| 6-acetyl-2-methylindenyl-3-α-fluoroacetaldehyde | p-methylsulfinylbenzaldehyde | 6-acetyl-2-methyl-1-(p-methylsulfinylbenzylidene)-indenyl-3-fluoroacetaldehyde-ethylene ketal |
| 5-carboethoxy-2-methylindenyl-3-α-fluoroacetaldehyde | p-methylsulfinylbenzaldehyde | 5-carboethoxy-2-methyl-1-(p-methylsulfinylbenzylidene)-indenyl-3-fluoroacetaldehyde-ethylene ketal |
| 5-carbamido-2-trifluoromethylindenyl-3-α-fluoroacetaldehyde | p-methylsulfinylbenzaldehyde | 5-carbamido-2-trifluoromethyl-1-(p-methylsulfinylbenzylidene)-indenyl-3-fluoroacetaldehyde-ethylene ketal |
| 6-carboxyl-2-fluoromethylindenyl-3-α-fluoroacetaldehyde | p-methylsulfinylbenzaldehyde | 6-carboxyl-2-fluoromethyl-1-(p-methylsulfinylbenzylidene)-indenyl-3-fluoroacetaldehyde-ethylene ketal |

F. 5-Nitro-2-methyl-1-(p-methylsulfinylbenzylidene)-indenyl-3-fluoroacetaldehyde 5-Nitro-2-methyl-1-(p-methylsulfinylbenzylidene)-indenyl-3-fluoroacetaldehyde-ethylene ketal is stirred in aqueous alcoholic hydrochloric acid (1:1 alcohol: 2.5 N ethanol evaporated off under reduced pressure and the compound either extracted or filtered from the residual aqueous solution.

Using the same reaction conditions and techniques, the following 1-substituted indenylacetaldehydes are prepared in accordance with the procedures of Examples 2E and 2F.

| STARTING MATERIAL | PRODUCT |
| --- | --- |
| 5-nitro-2-fluoromethyl-1-(p-methylsulfinylbenzylidene)-indenyl-3-fluoroacetaldehyde-ethylene ketal | 5-nitro-2-fluoromethyl-1-(p-methylsulfinylbenzylidene)-indenyl-3-fluoroacetaldehyde |
| 5-fluoromethyl-2-methyl-1-(p-methylsulfinylbenzylidene)-indenyl-3-fluoroacetaldehyde-ethylene ketal | 5-fluoromethyl-2-methyl-1-(p-methylsulfinylbenzylidene)-indenyl-3-fluoroacetaldehyde |
| 5-benzoyl-2-methyl-1-(p-methylsulfinylbenzylidene)-indenyl-3-fluoroacetaldehyde-ethylene ketal | 5-benzoyl-2-methyl-1-(p-methylsulfinylbenzylidene)-indenyl-3-fluoroacetaldehyde |
| 6-acetyl-2-methyl-1-(p-methylsulfinylbenzylidene)-indenyl-3-fluoroacetaldehyde-ethylene ketal | 6-acetyl-2-methyl-1-(p-methylsulfinylbenzylidene)-indenyl-3-fluoroacetaldehyde |
| 5-carboethoxy-2-methyl-1-(p-methylsulfinylbenzylidene)-indenyl-3-fluoroacetaldehyde-ethylene ketal | 5-carboethoxy-2-methyl-1-(p-methylsulfinylbenzylidene)-indenyl-3-fluoroacetaldehyde |
| 5-carbamido-2-trifluoromethyl-1-(p-methylsulfinylbenzylidene)-indenyl-3-fluoroacetaldehyde-ethylene ketal | 5-carbamido-2-trifluoromethyl-1-(p-methylsulfinylbenzylidene)-indenyl-3-fluoroacetaldehyde |
| 6-carboxyl-2-fluoromethyl-1-(p-methylsulfinylbenzylidene)-indenyl-3-fluoroacetaldehyde-ethylene ketal | 6-carboxyl-2-fluoromethyl-1-(p-methylsulfinylbenzylidene)-indenyl-3-fluoroacetaldehyde |

EXAMPLE 3

5-Dimethylamino-2-methyl-1-(p-methylsulfinylbenzylidene)-indenyl-3-fluoroacetaldehyde A. p-Methylsulfinylacetophenone p-Methylthioacetophenone (16.6 g.) is stirred in acetone-water (98:2;600 ml.) and sodium metaperiodate (21.4 g.) added in the minimum volume of 80° water over 1 hour. At this time the acetone is evaporated off at room temperature and the solid p-methylsulfinylacetophenone filtered off and dried.

p-Methylsulfinylphenacyl bromide

To p-methylsulfinylacetophenone (18.2 g.) in glacial acetic acid (100 ml.) is added slowly 40 g. of bromine. The mixture is vigorously shaken during the addition. When the addition is complete the flask is cooled in ice water and the title compound isolated.

C. p-Methylsulfinylphenylglyoxal hydrate

The above phenacyl bromide (26.0 g.) is dissolved in 100 ml. dimethyl sulfoxide at room temperature. After 9 hours the solution is pound into ice-water and extracted with diethyl ether, the extracts are washed with water and dried via magnesium sulfate. The derived glyoxal hydrate is purified by sublimation.

D. 5-Dimethylamino-2-methyl-1-(p-methylsulfinylbenzoylidene)-indenyl-3-fluoroacetaldehyde The above hydrate is reacted with 5-dimethylamino-2-methylindenyl-3-fluoroacetaldehyde ethylene ketal (as in Example 2E) and deblocked (as in Example 2F) to give the title compound.

EXAMPLE 4

A mixture of 250 parts of 5-fluoro-2-methyl-1-(p-methylsulfinylbenzylidene)-3-indenylacetaldehyde and 25 parts of lactose is granulated with suitable water and to this is added 100 parts of maize starch. The mass is passed through a 16-mesh screen. The granules are dried at a temperature below 60°C. The dry granules are passed through a 16-mesh screen and mixed with 3.8 parts of magnesium stearate. They are then compressed into tablets suitable for oral administration according to the method of this invention.

What is claimed is:

1. A pharmaceutical composition for treating pain, fever or inflammation comprising a pharmaceutically acceptable carrier and an effective amount of 5-fluoro-2-methyl-1-(p-methylsulfinylbenzylidene)-3-indenylacetaldehyde.

2. A method of treating pain, fever or inflammation which comprises administering to a host a therapeutically effective amount of 5-fluoro-2-methyl-1-(p-methylsulfinylbenzylidene)-3-indenylacetaldehyde.

* * * * *